United States Patent
Erba et al.

(10) Patent No.: US 8,401,063 B2
(45) Date of Patent: Mar. 19, 2013

(54) DECISION FEEDBACK EQUALIZATION SCHEME WITH MINIMUM CORRECTION DELAY

(75) Inventors: Simone Erba, Pavia (IT); Massimo Pozzoni, Pavia (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 719 days.

(21) Appl. No.: 12/419,347

(22) Filed: Apr. 7, 2009

(65) Prior Publication Data
US 2010/0103998 A1 Apr. 29, 2010

(30) Foreign Application Priority Data
Oct. 24, 2008 (IT) .............................. VA2008A0053

(51) Int. Cl.
*H03H 7/30* (2006.01)
(52) U.S. Cl. ........ 375/233; 375/346; 375/235; 375/234; 327/339; 327/530
(58) Field of Classification Search .............. 375/233, 375/346, 234, 235; 327/339, 530
See application file for complete search history.

(56) References Cited

U.S. PATENT DOCUMENTS

| | | | |
|---|---|---|---|
| 7,542,508 B2 * | 6/2009 | Marlett et al. ................ | 375/233 |
| 2004/0258145 A1 | 12/2004 | Popescu et al. | |
| 2005/0180498 A1 * | 8/2005 | Bhakta et al. ................ | 375/233 |
| 2006/0188043 A1 * | 8/2006 | Zerbe et al. ................... | 375/346 |
| 2007/0133671 A1 * | 6/2007 | Tsai ............................... | 375/233 |
| 2008/0187037 A1 * | 8/2008 | Bulzacchelli et al. ........ | 375/233 |

FOREIGN PATENT DOCUMENTS
EP 1545043 6/2005

OTHER PUBLICATIONS

Sonntag et al. "A Digital Clock and Data Recover Architecture for Multi-Gigabit/S Binary Links" Proceeding of the IEEE 2005 Custom Integrated Circuits Conference, Sep. 18, 2005 pp. 537-544.
Bien et al, "Digitaly Controlled 10-GB/S Adjustable Delay Line for Adaptive Filter Desing in Standard CMOS Technology" Proceedings Fo the IEEE 2007 International Symposium on Circuits and Systems (ISCAS), May 1, 2007: pp. 197-200.

* cited by examiner

*Primary Examiner* — Eva Puente
(74) *Attorney, Agent, or Firm* — Allen, Dyer, Doppelt, Milbrath & Gilchrist, P.A. Attorneys at Law

(57) ABSTRACT

A decision feedback equalizer includes a correction circuit to correct a sampled value of an incoming bit based on intersymbol interference of at least one preceding bit, and to generate a received bit. The correction circuit includes a first multiplexer and a first pair of latches coupled thereto. The first multiplexer is controlled by a clock signal to generate a digital level representative of a sign of a first correction coefficient to be subtracted from the sampled value of the incoming bit for deleting the intersymbol interference. The first pair of latches receives as input the received bit and is clocked in phase opposition by the clock signal to generate respective latched replicas of the received bit during respective active phases of the clock signal. The respective latched replicas are input to the first multiplexer.

16 Claims, 11 Drawing Sheets

DECISION FEEDBACK EQUALIZATION SCHEME WITH MINIMUM CORRECTION DELAY

FIELD OF THE INVENTION

The present invention relates to equalization of large bit rate signals to compensate for the degradation generated by transmission through a channel affected by a limited bandwidth and other limiting factors.

BACKGROUND OF THE INVENTION

In serial transmission systems operating at high bit rates over standard pc-boards or coaxial cables, data receivers may receive significantly distorted signals. Inter-symbolic interference or intersymbol interference (ISI) generated by bandwidth finiteness, reflections due to impedance mismatches and other limiting factors of the transmission media increase the probability of an erroneous recognition of a received bit. For these reasons, it becomes necessary to place, at the receiver input, a circuit to recover the signal before sending it to a re-sampler. Otherwise, the signal arriving at the sampler could be affected by amplitude reduction (vertical eye closure) and/or by timing jitter (horizontal eye closure) as depicted in FIG. 1.

Inside the receiver, a clock and data recovery block (CDR) has the function to reconstruct the right clock timing for correctly re-sampling the received data ideally at the middle of the "eye", however, horizontal (timing) and vertical (amplitude) degradation of the eye negatively affect the CDR capability of correctly recovering the incoming signal (bit). In fact, as a consequence of timing jitter and of amplitude reduction suffered by the transmitted data pulse signal, the CDR is required to have an adequately enhanced precision in positioning the sampling clock at the center of the eye and sensitivity to small amplitude signals.

A typical serial transmission chain is shown in FIG. 2. A linear equalizer is usually placed at the input of the receiver implementing a frequency transfer function with the target of matching the reverse of the transfer function of the transmission channel H(s). If such a match is achieved, the aperture of the "eye" is improved, both horizontally and vertically.

Upon increasing the operating frequency, the capability of such a linear equalizer acting as a high pass filter matching the reverse of the transfer function of the transmission channel may be inadequate to provide sufficient compensation of the channel frequency losses. As a result, a different technique of equalization, known as decision feedback equalization (DFE), is implemented between the linear equalizer and the re-sampler. The DEE may even completely substitute traditional linear equalization.

FIG. 3a shows an example of the degradation of a unit pulse (namely a pulse whose amplitude is 1 Volt and whose duration is a 1 bit unit interval (UI)) caused by bandwidth finiteness and other limiting factors of the transmission channel. The resulting pulse has a lower peak value and a longer duration.

Considering the transmission channel as a linear system, a generic received signal can be seen as the superposition of individual pulses of positive or negative polarity, based on if positive or negative bits are transmitted. An example of a train of adjacent data pulses having the same amplitude and sign as received is shown in FIG. 3b.

If we assume the receiver to be correctly sampling each bit of the received data pulse signal at its pulse peak ($C_0$ or cursor value), postcursor amplitude values of pulse tails of the bits preceding the bit subject of sampling, eventually as well as precursor amplitude values of successive bits as received, sum to the cursor value as an ISI contribution to the sampled amplitude of the incoming signal. The known DFE technique is based on the principle that because the previous data bits are known, their contributory effects in producing ISI on the incoming data bit may be determined and deleted by subtracting a quantity equal to the ISI that is produced on an incoming data bit.

A DFE uses sampled values ($b_n$) and respective sampling errors ($e_n$) to estimate channel-dependent coefficients ($c_i$) that multiply with the correspondent previous bits and subtracts the results from the incoming data bit. An exemplary implementation of a DFE using four coefficients is shown in FIG. 4. The $b_n$ value is provided by a comparator COMP1 that checks if its input is positive or negative and produces a $b_n$ signal whose amplitude is set to +vth or −vth, according to the input signal polarity. A second comparator COMP2 compares the input and the output of the comparator COMP1 for providing error information to an estimator (LMS) of the coefficients $c_i$.

In a practical implementation, the comparator COMP1 may not materially be present because it can be seen as part of the sampling flip-flop FF1. In this case, for the generation of the sampling error information ($e_n$) the input and the output of the flip-flop FF1 can be directly monitored by any circuit adapted to perform the logic function of the COMP2 comparator. Commonly, Least Mean Squares (LMS) algorithms are employed to estimate the coefficients $c_i$ and find the best set of coefficients $c_i$ that minimizes or reduces the mean square error $e_n$ between the value of the expected bits (± a certain threshold Vth) and the received bits.

Whether a single estimated coefficient is used (simplest implementation with a single correction tap) or several coefficients are used (more refined implementation with several correction taps) for enhanced ISI deletion, in order to ensure correct behavior of a DFE circuit in terms of data recovery, a first or unique correction by the first ($c_1$) of the estimated coefficients needs to be effected before sampling the next bit. To satisfy this requirement, the DFE feedback path for the first or unique estimated coefficient $c_1$ cannot have a signal propagation delay greater than the bit period ($T_{bit}$), and usually the propagation delay is smaller than the bit period.

On the other hand, to improve the Clock Recovery capability of correctly recovering the incoming signal phase, the Clock Recovery needs to receive, as its input, the same signal equalized by the DFE corrections. In case of a Clock Recovery based on the analysis of the data transitions (as, for example, the case of bang-bang CDRs), the DFE feedback needs to be applied before the transition of the data, which puts the constraint that the maximum delay for the application of the DFE correction needs to be less than $T_{bit}/2$. Reference is directed to the article "NRZ Timing Recovery Technique for Band Limited Channels," by Bang-Sup Song, IEEE Journal of Solid-State Circuits, Vol. 32, No. 4, April 1997.

Often receivers use a half rate clock, where the expression means that the frequency of the clock that generally is recovered from the incoming data bitstream is half that of the bit-rate of the transmitted data pulse signal, and both rising and falling edges are utilized to sample the incoming data. On the other hand, because the DFE corrects the incoming bit on account of the ISI of a single previous bit or of several previous bits, a DFE implementation as that shown in FIG. 4 will necessarily be a full-rate system.

The DFE can be adapted to a half-rate clocking scheme of the receiver by using a multiplexer that selects which of the two samples (the data sampled by the rising clock edge and the one sampled by the falling clock edge) has to be alternately used as the previous bit (pre-cursor bit) to be multiplied by the $c_i$ coefficient before being subtracted from the input bit (cursor bit), as with the exemplary circuit of FIG. 5. The flip-flops FF1 and FF3 provide a sampled value of their input at the rising edge of the clock, while the flip-flops FF2 and FF4 provide a sampled value of their input at the falling edge of the clock. The multiplexers select their input 1 on the high level of the clock and their input 2 on the low level of the clock.

In this description, the clock ck of the multiplexers has been depicted as being the same clock of the flip-flops. However, it is possible to have some difference between the clock of the multiplexers and the clock of the flip-flops, without changing the basic concept.

As previously stated, the DFE corrections have a setting time $T_{bit}$ for the data recovery and a setting time $T_{bit}/2$ for the clock recovery requirement. Considering FF1 and FF3 as providing sampled values of their inputs at every rising edge of the clock in FIG. 6, the generation of signC1 and signC3 is more critical than the generation of signC2 and signC4, because the C1 and C3 multiplexers switch during the commutation of FFout1 and FFout3, while C2 and C4 multiplexers switch while FFout2 and FFout4 are stable. Therefore, signC1 and signC3 are affected by the FF1 and FF3 clock to Q delay, while signC2 and signC4 are only affected by the multiplexer delay. Considering, the operation of FF2 and FF4 that provide sampled values of their inputs at the falling edge of the clock in FIG. 6, the evaluation of signC1 and signC3 are still critical because the multiplexers that generate them switch during the commutation of FFout2 and FFout4.

Despite the fact that signC1 and signC3 appear to have the same timing requirements, in practical implementations signC1 usually represents the bottleneck of the system. This is due to the fact that the signC3 multiplexer inputs FFout3 and FFout4 have already been converted into high swing digital voltage levels by the two respective samplers FF1, FF3, and FF2, FF4. On the contrary, the signC1 multiplexer inputs FFout1 and FFout2 come from a single flip-flop (FF1 and FF2) that, according to the data rate, to the channel and to the transmission amplitude, may sample a small amount of analog data. In fact, the COMP1 squarer may be commonly avoided to minimize or reduce the feedback delay or, even if it is present, its squaring capability to convert its input into high swing digital voltage levels may be too low. FF1 and FF2 clock to Q delays can therefore lead to a failure of the condition of the total delay being less than $T_{bit}/2$.

Prior art implementations address the problem of the DFE critical timing path using a sense amplifier based FF1 and FF2 sampler, as provided in the article "A 6.25-Gb/s Binary Transceiver in 0.13-μm CMOS for Serial Data Transmission Across High Loss Legacy Backplane Channels", by Payne et al., IEEE Journal of Solid-State Circuits, Vol. 40, No. 12, December 2005. The problem of the DFE critical timing path may also be addressed by implementing the first correction via the loop unroll technique. Reference is directed to the article "A 6.4-Gb/s CMOS SerDes Core With Feed-Forward and Decision-Feedback Equalization," by Beukema et al., IEEE Journal of Solid-State Circuits, Vol. 40, No. 12, December 2005. The first implementation, dealing with the boost of the first flip-flop sensitivity, is intrinsically bandwidth limited as the ratio bandwidth over sensitivity is limited by the technology. The second implementation requires a hardware overhead, increasing the area and power consumption of the stage.

SUMMARY OF THE INVENTION

In view of the foregoing background, it is therefore an object of the present invention to reduce the correction delay in decision feedback equalizers.

This and other objects, features, and advantages in accordance with the present invention are provided by a decision feedback equalizer that deletes intersymbol interference induced by bandwidth finiteness and other limiting factors of a data signal transmission channel, in a bitstream received and sampled in a receiver, The receiver may use a correction circuit that corrects the sampled value of an incoming bit on account of the intersymbol interference component of at least a preceding bit, and to generate a correct received bit.

The correction circuit may include at least a multiplexer controlled by a clock signal and adapted to generate a digital level representative of a sign of at least a first correction coefficient to be subtracted from the sampled value for deleting the intersymbol interference.

The decision feedback equalizer may comprise at least a pair of latches input with the received bit and clocked in phase opposition by the clock signal, adapted to generate respective latched replicas of the input bit during respective active phases of the clock signal. The two latched replicas may then be input to the multiplexer controlled by the clock signal.

According to one embodiment for correcting the sampled value of the incoming bit at least with the two immediately preceding bits, the decision feedback equalizer may further comprise a second pair of latches connected in cascade with the first pair of latches, clocked in phase opposition between them and each one with respect to its related latch upstream. A second multiplexer identical to the first multiplexer may be used to receive the outputs of the second pair of latches. The architecture of the decision feedback equalizer may be adapted to correct the sampled value on account of the intersymbol interference components of any number of antecedent bits.

DETAILED DESCRIPTION OF THE PREFERRED EMBODIMENTS

The ensuing detailed description and the related drawings to which it refers are not to be taken in a limiting sense, but are provided solely for the purpose of illustrating the general principles of the invention.

Figure 1:
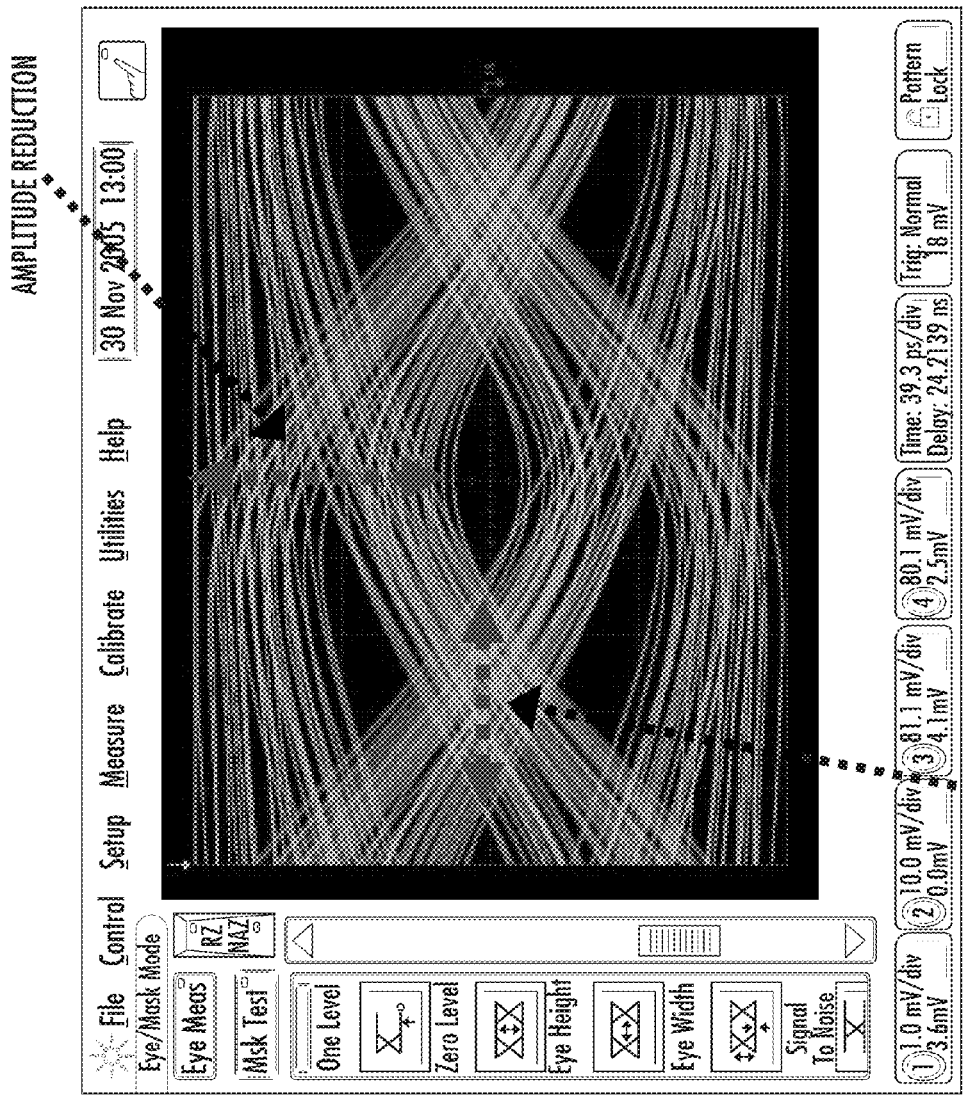
FIG. 1 is a photographic reproduction of an oscilloscopic image of a signal analyzer showing the timing jitter and amplitude reduction effects in a received data pulse signal according to the prior art.
Figure 2:
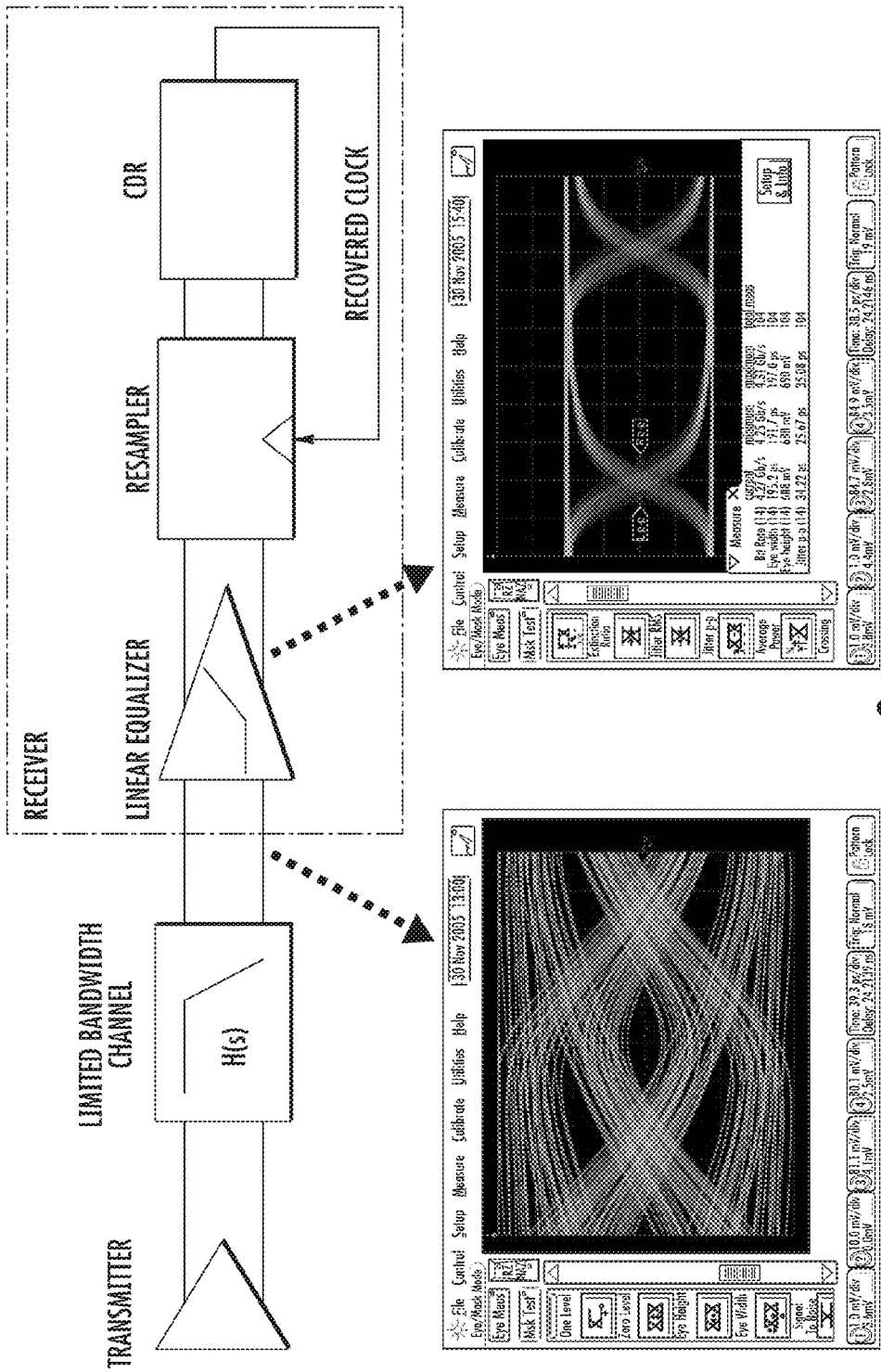
FIG. 2 is a block diagram of a serial data transmission chain and related oscilloscope images showing the effect of the linear equalizer commonly employed at the receiver input according to the prior art.
Figure 3A:
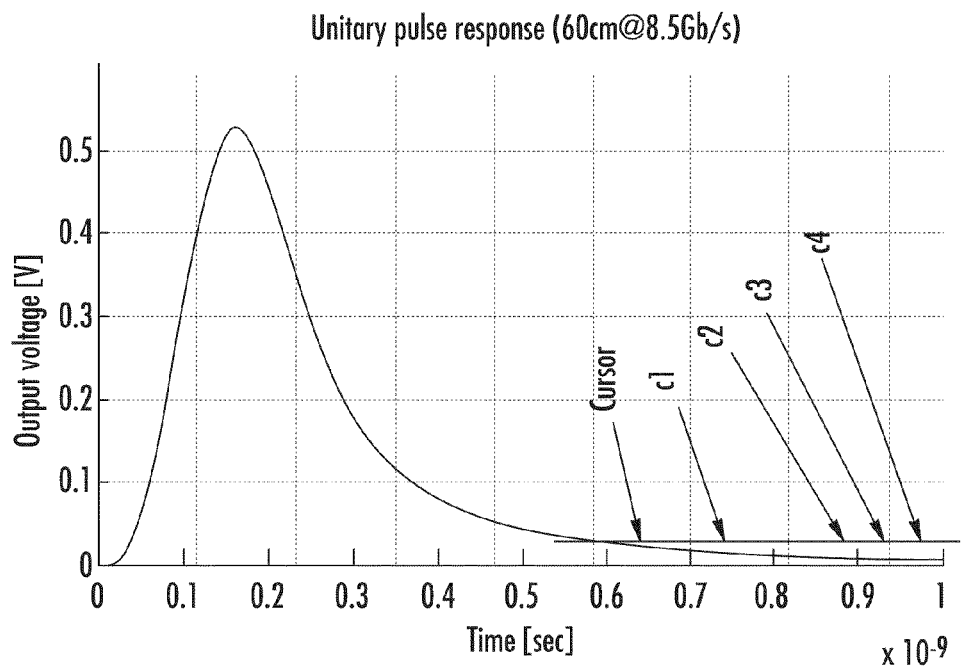
FIG. 3a and FIG. 3b are graphs illustrating generation of ISI by adding contributions to the measured value in a sequence of individual unit pulse responses and the meaning of the estimated $c_i$ coefficients (contributive weight of antecedent or pre-cursor and successive or post-cursor bits) as values of a certain individual unit pulse response propagating through the channel, spaced by a unit bit length interval (UI) according to the prior art.
Figure 3B:
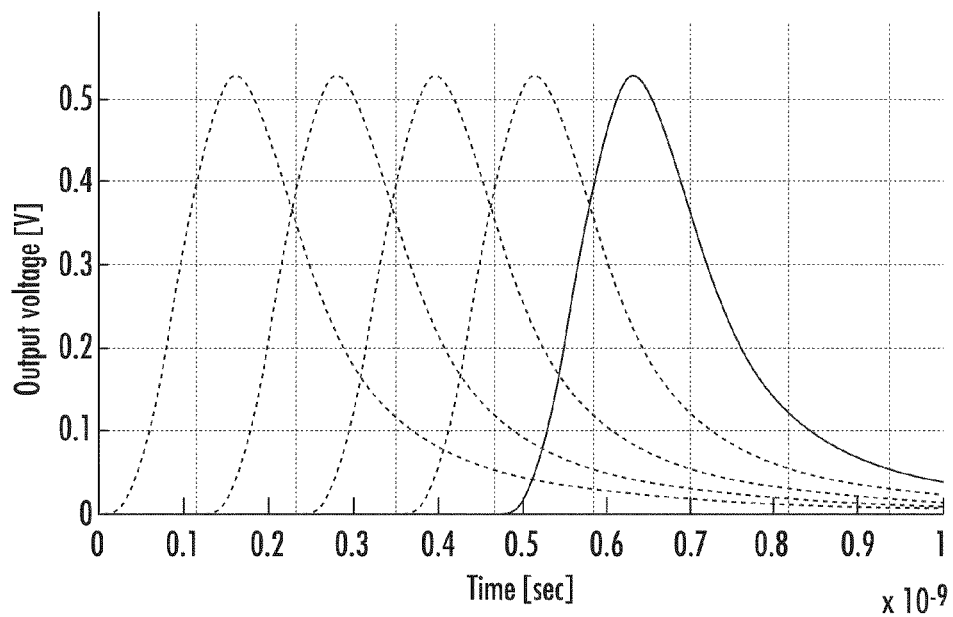
Figure 4:
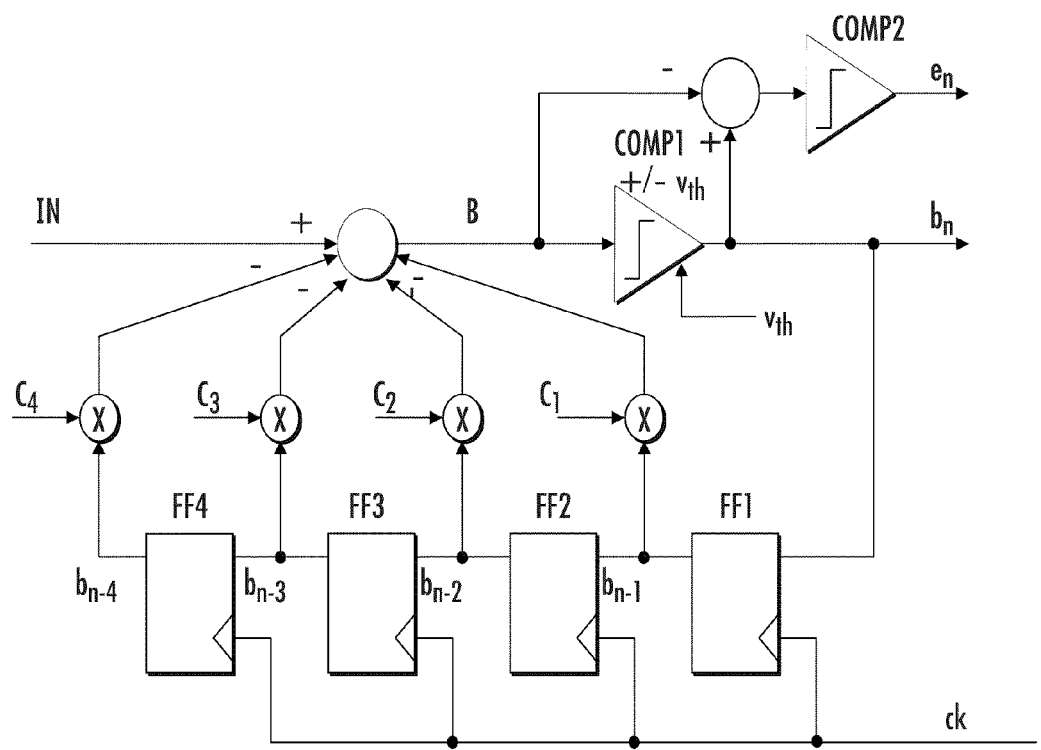
FIG. 4 is a block diagram of a DFE for a receiver with a full-rate clocking scheme according to the prior art.
Figure 5:
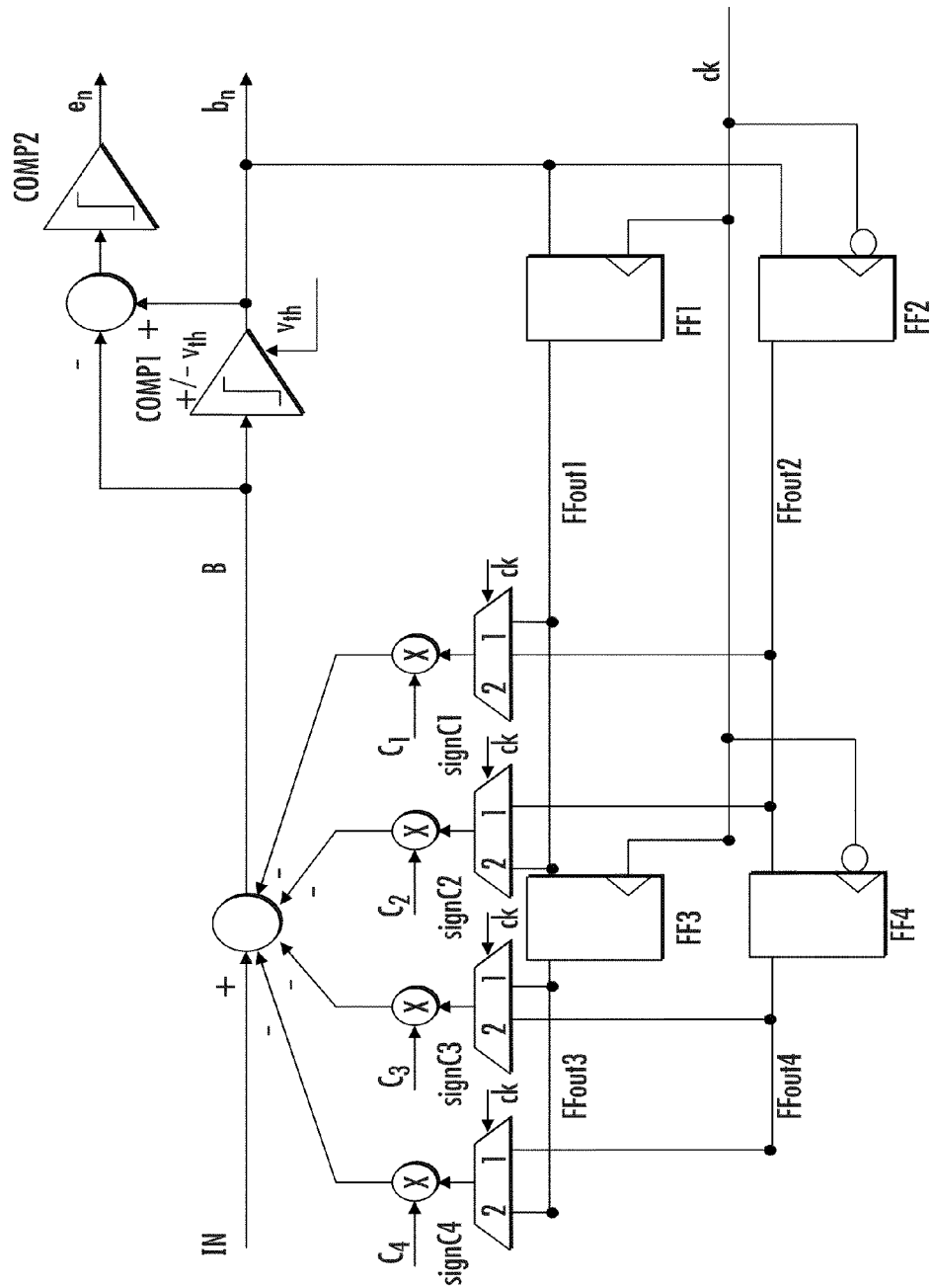
FIG. 5 is a block diagram of a DFE for the case of a half-rate clocking scheme of the receiver according to the prior art.
Figure 6:
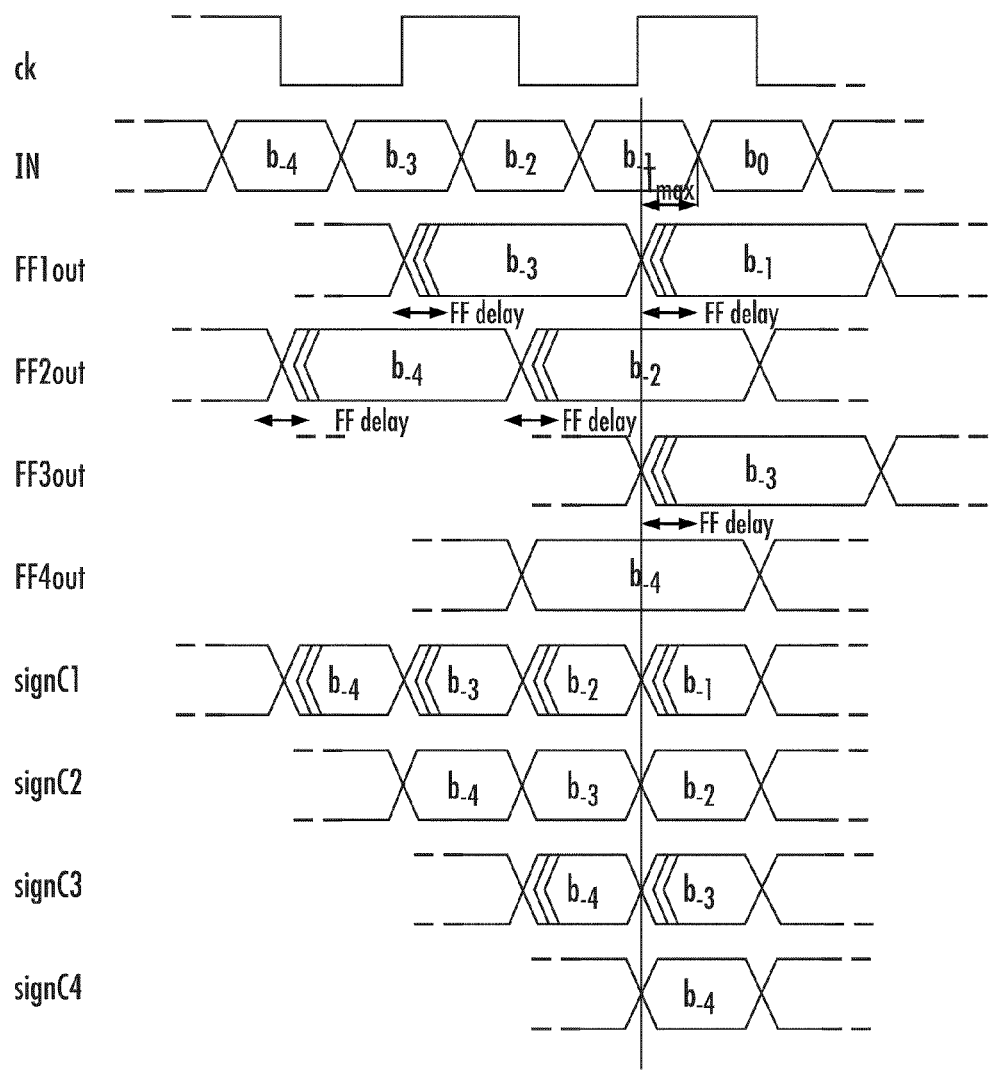
FIG. 6 is a timing diagram of the main signals of the circuit illustrated in FIG. 5.
Figure 7:
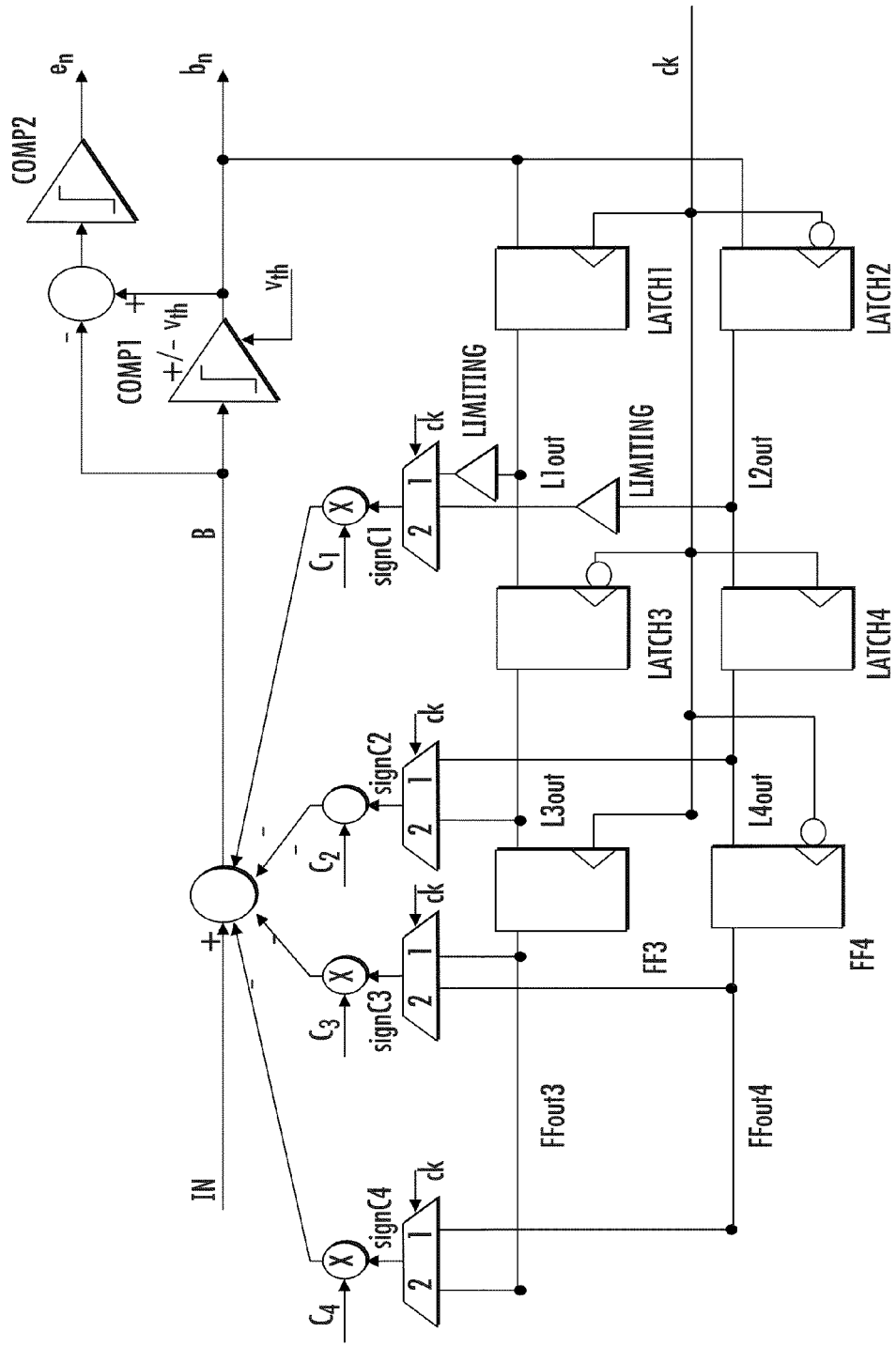
FIG. 7 is a block diagram for a half-rate DFE implementation for reducing propagation delay in the feedback loop relative to the first coefficient $c_1$ according to the present invention.
Figure 8:
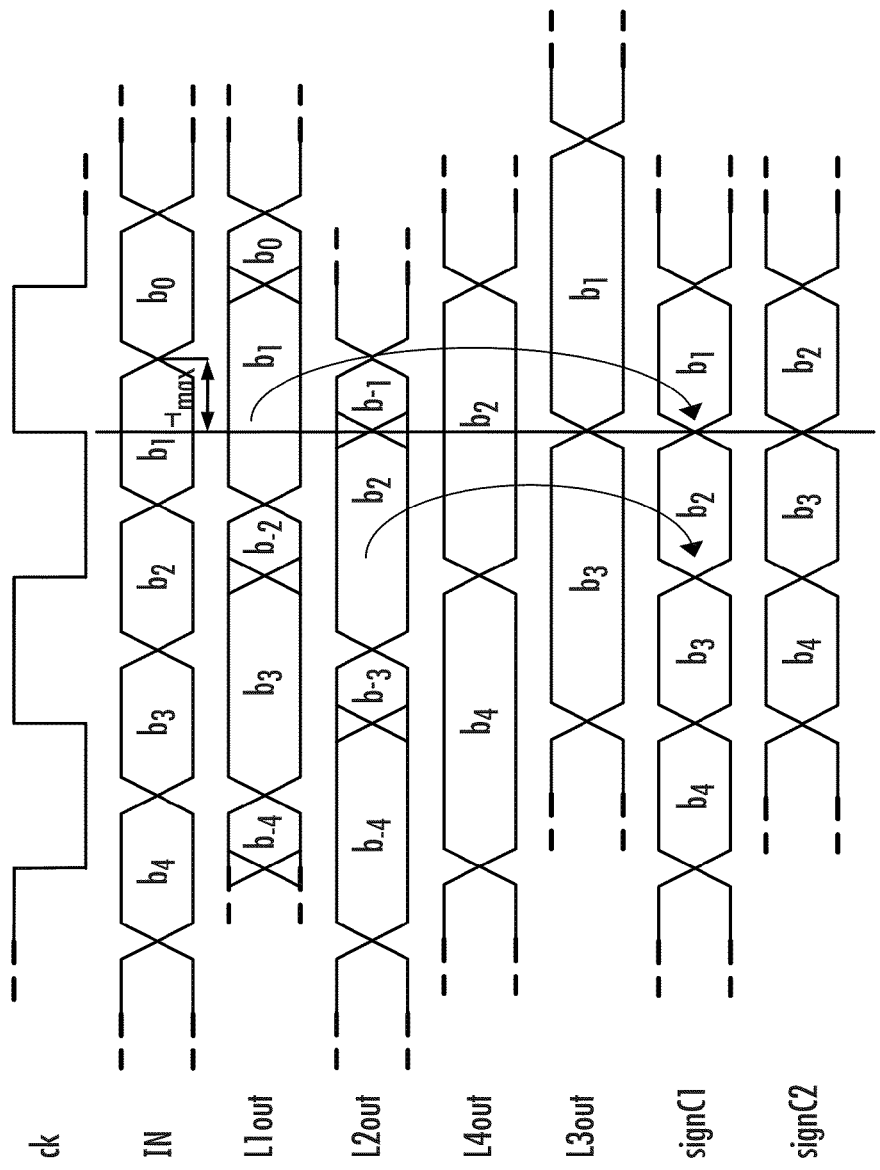
FIG. 8 is a timing diagram of the main signals of the circuit illustrated in FIG. 7.

In the embodiment depicted in FIG. 7, the data exploited to calculate signC1 is taken downstream from the master latches (LATCH1 and LATCH2) of the FF1 and FF2 flip-flops of the DFE implementation illustrated in FIG. 5. The data may also be amplified by a LIMITING stage before being multiplexed. Considering the LATCH1 output as practically tracking its input during the low level phases of the clock in the circuit diagram of FIG. 8, the sign evaluation of the C1 tap has been improved because its multiplexer switches when the input L1OUT is already stable. Taking, as an example, the value $b_{-1}$, the LATCH1, after tracking the input data $b_{-1}$ for at least $T_{bit}/2$, enters its hold phase on the rising edge of the clock.

Similarly, the C1 tap multiplexer switches on the L2OUT value during its stable state on $b_{-2}$ on the L4OUT. Because LATCH1 and LATCH2 may latch small analog data, in order to further improve the clock to Q delay of the multiplexer and to ensure a good logic level of signC1, the latched data L1OUT and L2OUT may be amplified by a gain stage (LIMITING). The signC2, signC3 and signC4 evaluation timing path are unchanged.

Figure 9:
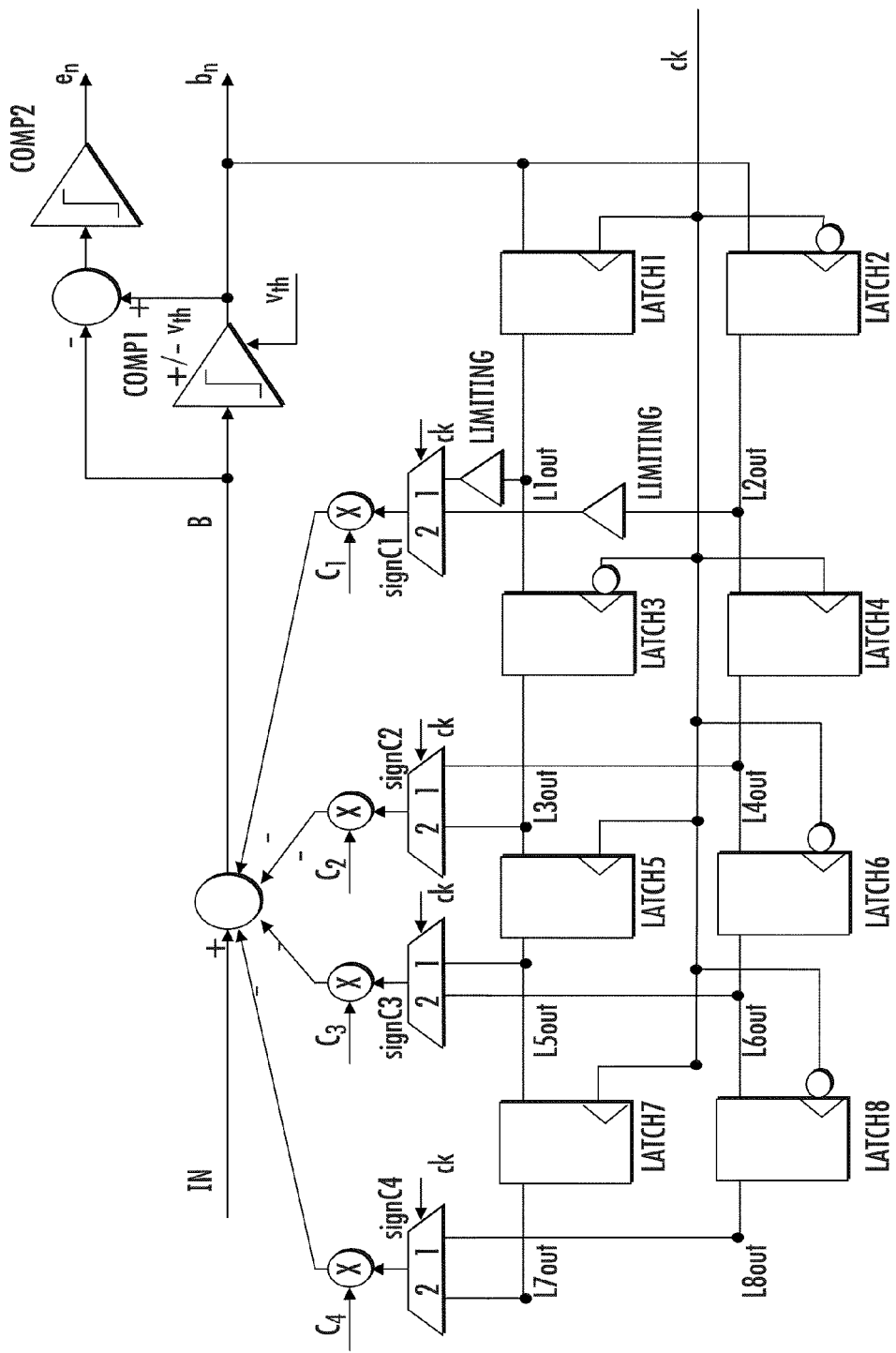
FIG. 9 is another block diagram for reducing feedback signal propagation delay that may be generalized for any number of contemplated DFE correction taps relative to as many coefficients $c_i$ according to the present invention.

Using the same technique, the signC3 timing path can be improved by the architecture implemented in FIG. 9, where the C3 tap multiplexer input data is the outputs of the master latches (LATCH5 and LATCH6) of the FF3 and FF4 flip-flops of the DFE implementation of FIG. 5. As the L5out and L6out data come from a cascade of three regenerative latch stages, the limiting stages before the multiplexer inputs are not required, but can be optionally added.

Figure 10:
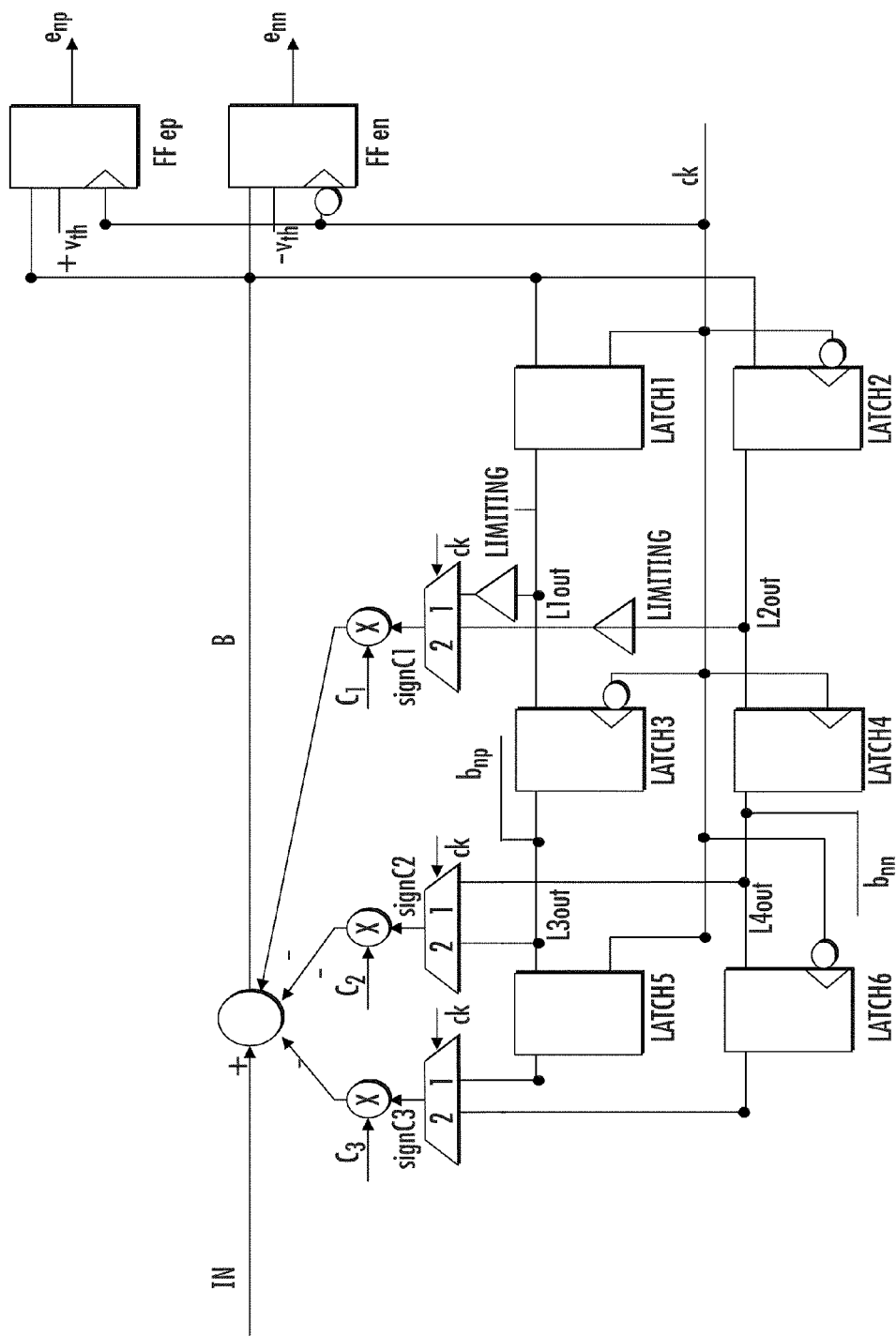
FIG. 10 is a block diagram of a DFE alternative to that of FIG. 9, provided with a circuit for evaluating the error according to the present invention.

This implementation can be generalized to any N number of DFE taps by adding N pairs of latches in the shift register and their respective multiplexers. A practical implementation of the described architecture is shown in FIG. 10. The squarer effect of the COMP1 comparator is included in the first latch stages (LATCH1 and LATCH2), whose output values are the output levels implemented in the logic (for instance: differential CML).

Two variable-threshold samplers (FFep FFen) can be used to provide information to adaptation logic to adapt the values both of the $c_i$ coefficients and of the Vth shifts according to the transmission channel. This error evaluation requires computing of the difference between the analog DFE corrected signal before the squarer and the decided bit after being squared to logic levels ±Vth (that are a function of the transmission channel characteristics). This function is implemented by the flip-flops FFep and FFen with a programmable threshold set to ±Vth. This results in sampling equivalent inputs B+Vth and B−Vth, respectively.

For a specific $b_n$ sampled bit, only one of these two ($e_{nn}$ and $e_{np}$) sampled signals is meaningful. In fact, in the scheme of FIG. 10, B+Vth is evaluated only on the rising edge of the clock while B−Vth is evaluated only on the falling edge of the clock. For this reason, a downstream logic circuit is required to select the appropriate value between $e_{nn}$ and $e_{np}$ or to disregard both of them, according to the sign of the evaluated bit $b_n$ and the polarity of the sampling clock.

Figure 11:
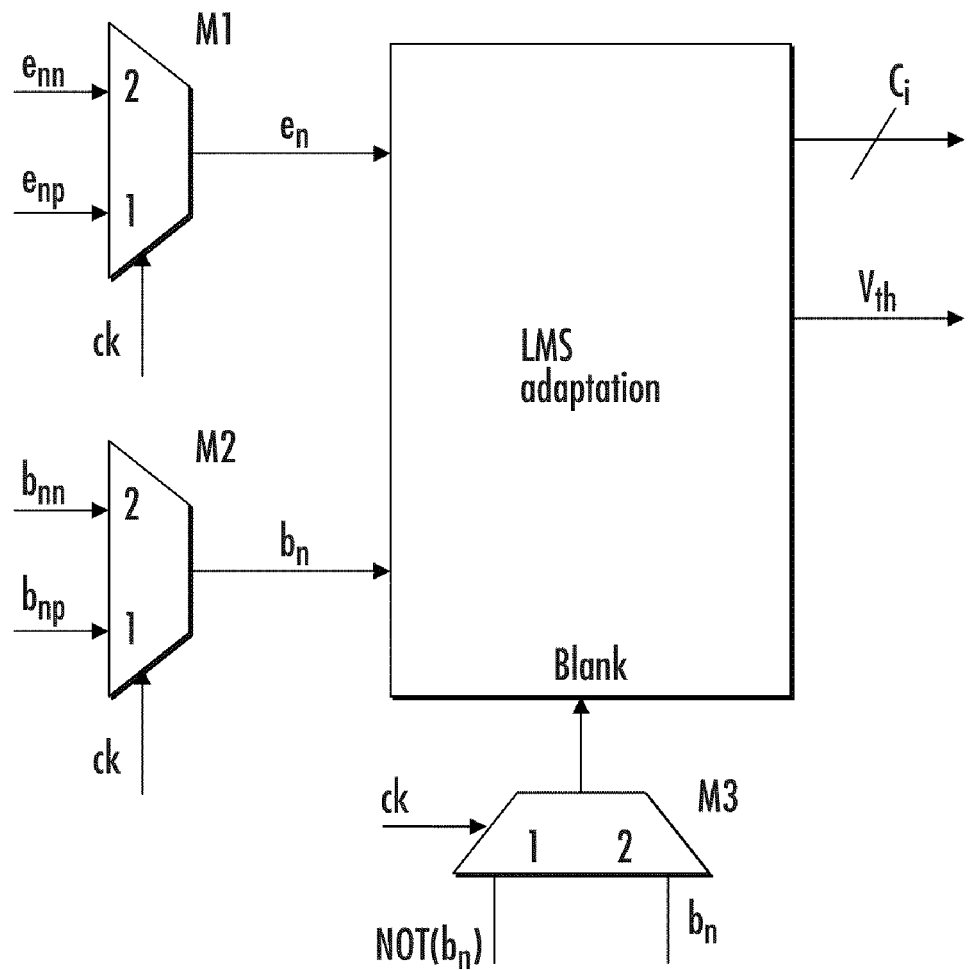
FIG. 11 is a block diagram of logic circuitry for selecting the meaningful error signal as a function of the received bit according to the present invention.

Such a logic circuit is disclosed, for example, in FIG. 11. The multiplexers M1 and M2 associate odd detected bits $b_n$ to odd detected values of $e_n$ (and even detected bits to even detected values $e_n$). These values are delivered to the adaptation block LMS that will adapt the values of the $c_i$ taps and of the $V_{th}$ thresholds by using least mean squares techniques. A BLANK or disabled input has been inserted in the adaptation block LMS to disable the evaluation of the $b_n$ and $e_n$ inputs. The multiplexer M3 disables the LMS operation when the $b_n$ bits sampled by the rising edge of the clock take a low logic value, and when the $b_n$ bits sampled by the falling edge of the clock take a high logic value. An equivalent implementation can be done inverting the inputs of the M3 multiplexer and the application of +Vth and −Vth in FIG. 10.

An equivalent approach with four variable-threshold samplers computing B+Vth and B−Vth for both the rising and the falling edge of the clock can be used. In this case, the BLANK function of FIG. 11 is not required.

That which is claimed is:

1. A decision feedback equalizer comprising:
   a correction circuit to correct a sampled value of an incoming bit based on intersymbol interference of at least one preceding bit, and to generate a received bit, said correction circuit comprising
   a first multiplexer to be controlled by a clock signal to generate a digital level representative of a sign of a first correction coefficient to be subtracted from the sampled value of the incoming bit for deleting the intersymbol interference,
   a first pair of master latches to receive as input the received bit and being clocked in phase opposition by the clock signal to generate respective latched replicas of the received bit during respective active phases of the clock signal, with the respective latched replicas being input to said first multiplexer; and
   a first pair of amplifiers coupled between said first pair of master latches and said first multiplexer, said first pair of amplifiers to amplify and saturate the latched replicas to be input to said first multiplexer.

2. The decision feedback equalizer of claim 1, wherein the sampled value of the incoming bit being corrected by said correction circuit is based on two preceding bits; and wherein said correction circuit further comprises:
   a second multiplexer to be controlled by the clock signal to generate a digital level representative of a sign of a second correction coefficient to be subtracted from the sampled value of the incoming bit for deleting the intersymbol interference therein; and
   a second pair of latches connected in cascade with said first pair of master latches to receive as input the latched replicas generated by said first pair of master latches, said second pair of latches being clocked in phase opposition by the clock signal to generate latched replicas with respect to said first pair of master latches, the latched replicas of said second pair of latches being input to said second multiplexer.

3. The decision feedback equalizer of claim 1, wherein said correction circuit further comprises a logic comparator to receive a sampled level corrected from the intersymbol interference, and to generate the received bit responsive thereto.

4. The decision feedback equalizer of claim 1, further comprising a pair of flip-flops with a programmable threshold set to opposite logic levels and clocked in phase opposition with the clock signal, said pair of flip-flops to generate respective error signals as a difference between the sampled value corrected from the intersymbol interference and the respective threshold.

5. A decision feedback equalizer comprising:
   a correction circuit to correct a sampled value of an incoming bit based on intersymbol interference of at least one preceding bit, and to generate a received bit, said correction circuit comprising
   a first multiplexer to be controlled by a clock signal to generate a digital level representative of a sign of a first correction coefficient to be subtracted from the sampled value of the incoming bit for deleting the intersymbol interference,
   a first pair of latches to receive as input the received bit and being clocked in phase opposition by the clock signal to generate respective latched replicas of the received bit during respective active phases of the clock signal, with the respective latched replicas being input to said first multiplexer, and
   a first pair of amplifiers coupled between said first pair of latches and said first multiplexer.

6. The decision feedback equalizer of claim 5, wherein the sampled value of the incoming bit being corrected by said correction circuit is based on two preceding bits; and wherein said correction circuit further comprises:
   a second multiplexer to be controlled by the clock signal to generate a digital level representative of a sign of a second correction coefficient to be subtracted from the sampled value of the incoming bit for deleting the intersymbol interference therein; and
   a second pair of latches connected in cascade with said first pair of latches to receive as input the latched replicas generated by said first pair of latches, said second pair of latches being clocked in phase opposition by the clock signal to generate latched replicas with respect to said first pair of latches, the latched replicas of said second pair of latches being input to said second multiplexer.

7. The decision feedback equalizer of claim 5, wherein said correction circuit further comprises a logic comparator to receive a sampled level corrected from the intersymbol interference, and to generate the received bit responsive thereto.

8. The decision feedback equalizer of claim 5, further comprising a pair of flip-flops with a programmable threshold set to opposite logic levels and clocked in phase opposition with the clock signal, said pair of flip-flops to generate respective error signals as a difference between the sampled value corrected from the intersymbol interference and the respective threshold.

9. A receiver comprising:
   a decision feedback equalizer to correct a sampled value of an incoming bit based on intersymbol interference of at least one preceding bit, and to generate a received bit, said decision feedback equalizer comprising
   a first multiplexer to be controlled by a clock signal to generate a digital level representative of a sign of a first correction coefficient to be subtracted from the sampled value of the incoming bit for deleting the intersymbol interference,
   a first pair of master latches to receive as input the received bit and being clocked in phase opposition by the clock signal to generate respective latched replicas of the received bit during respective active phases of the clock signal, with the respective latched replicas being input to said first multiplexer; and
   a first pair of amplifiers coupled between said first pair of master latches and said first multiplexer.

10. The receiver of claim 9, wherein the sampled value of the incoming bit being corrected by said decision feedback equalizer is based on two preceding bits; and wherein said decision feedback equalizer further comprises:
    a second multiplexer to be controlled by the clock signal to generate a digital level representative of a sign of a second correction coefficient to be subtracted from the sampled value of the incoming bit for deleting the intersymbol interference therein; and
    a second pair of latches connected in cascade with said first pair of master latches to receive as input the latched replicas generated by said first pair of master latches, said second pair of latches being clocked in phase opposition by the clock signal to generate latched replicas with respect to said first pair of master latches, the latched replicas of said second pair of latches being input to said second multiplexer.

11. The receiver of claim 9, wherein said decision feedback equalizer further comprises a logic comparator to receive a sampled level corrected from the intersymbol interference, and to generate the received bit responsive thereto.

12. The receiver of claim 9, wherein said decision feedback equalizer further comprises a pair of flip-flops with a programmable threshold set to opposite logic levels and clocked in phase opposition with the clock signal, said pair of flip-flops to generate respective error signals as a difference between the sampled value corrected from the intersymbol interference and the respective threshold.

13. A method for operating a decision feedback equalizer comprising a correction circuit to correct a sampled value of an incoming bit based on intersymbol interference of at least one preceding bit, and to generate a received bit, the correction circuit comprising a first multiplexer and a first pair of master latches coupled thereto, and a first pair of amplifiers coupled between the first pair of master latches and the first multiplexer, the method comprising:
    controlling the first multiplexer with the clock signal to generate a digital level representative of a sign of a first correction coefficient to be subtracted from the sampled value of the incoming bit for deleting the intersymbol interference; and
    controlling the first pair of master latches to receive as input the received bit and clocking the first pair of master latches in phase opposition by the clock signal to generate respective latched replicas of the received bit during respective active phases of the clock signal, with the respective latched replicas being amplified by the first pair of amplifiers before being input to the first multiplexer.

14. The method of claim 13, wherein the sampled value of the incoming bit being corrected by the correction circuit is based on two preceding bits; and wherein the correction circuit further comprises a second multiplexer and a second pair of latches connected in cascade with the first pair of master latches, and further comprising:
    controlling the second multiplexer with the clock signal to generate a digital level representative of a sign of a second correction coefficient to be subtracted from the sampled value of the incoming bit for deleting the intersymbol interference therein; and
    controlling the second pair of latches to receive as input the latched replicas generated by the first pair of master latches, the second pair of latches being clocked in phase opposition by the clock signal to generate latched replicas with respect to the first pair of master latches, the latched replicas of the second pair of latches being input to the second multiplexer.

15. The method of claim 13, wherein the correction circuit further comprises a logic comparator to receive a sampled level corrected from the intersymbol interference, and to generate the received bit responsive thereto.

16. The method of claim 13, wherein the correction circuit further comprises a pair of flip-flops with a programmable threshold set to opposite logic levels and clocked in phase opposition with the clock signal, the pair of flip-flops to generate respective error signals as a difference between the sampled value corrected from the intersymbol interference and the respective threshold.

* * * * *